US006226612B1

(12) United States Patent
Srenger et al.

(10) Patent No.: US 6,226,612 B1
(45) Date of Patent: May 1, 2001

(54) METHOD OF EVALUATING AN UTTERANCE IN A SPEECH RECOGNITION SYSTEM

(75) Inventors: Edward Srenger, Schaumburg; Jeffrey A. Meunier, Chicago; William M. Kushner, Arlington Heights, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/016,214

(22) Filed: Jan. 30, 1998

(51) Int. Cl.[7] .................................................. G10L 15/14
(52) U.S. Cl. .......................... 704/256; 704/240; 704/242
(58) Field of Search ..................................... 704/231, 251, 704/255, 256, 236, 239, 240, 242, 244

(56) References Cited

U.S. PATENT DOCUMENTS

| | | | |
|---|---|---|---|
| 5,832,063 | * 11/1998 | Vysotsky et al. | 379/88 |
| 5,842,165 | * 11/1998 | Raman et al. | 704/255 |
| 5,895,448 | * 4/1999 | Vysotsky et al. | 704/251 |

OTHER PUBLICATIONS

ICASSP–97. Acoustics, Speech, and Signal Processing, Apr. 1997. Caminero et al., "Improving utterance verification using hierarchical confidence measures in continuous natural numbers recognition". Pp. 891–894, vol. 2.*

ICASSP–96. Acoustics, Speech, and Signal Processing, May 1996. Rivlin et al., "A phone–dependent confidence measure for utterance rejection". Pp. 515–517, vol. 1.*

Spoken Language, Oct. 1996. ICSLP 96. Procedings., Forurth International Conference on. Caminero et al., "On–line garbage modeling with discriminant analysis for utterance verification". Pp. 2111–2114, vol. 4.*

Vijay Raman and Vidhya Ramanujam, "Robustness Issues and Solutions in Speech Recognition Based Telephony Services", NYNEX Science and Technology, Inc., IEEE, 1997, pp. 1523–1526.

* cited by examiner

*Primary Examiner*—Richemond Dorvil
(74) *Attorney, Agent, or Firm*—John J. King; Daniel R. Collopy

(57) ABSTRACT

The present invention provides a method of calculating, within the framework of a speaker dependent system, a standard filler, or garbage model, for the detection of out-of-vocabulary utterances. In particular, the method receives new training data in a speech recognition system (202); calculates statistical parameters for the new training data (204); calculates global statistical parameters based upon the statistical parameters for the new training data (206); and updates a garbage model based upon the global statistical parameters (208). This is carried out on-line while the user is enrolling the vocabulary. The garbage model described in this disclosure is preferably an average speaker model, representative of all the speech data enrolled by the user to date. Also, the garbage model is preferably obtained as a by-product of the vocabulary enrollment procedure and is similar in it characteristics and topology to all the other regular vocabulary HMMs.

40 Claims, 5 Drawing Sheets

METHOD OF EVALUATING AN UTTERANCE IN A SPEECH RECOGNITION SYSTEM

FIELD OF THE INVENTION

This application is related to a speech recognition system, and more particularly to a method of evaluating an utterance in a speech recognition system.

BACKGROUND OF THE INVENTION

Most speaker dependent speech recognition systems do not have the capability of detecting recognition errors triggered by out-of-vocabulary (OOV) words or by utterances that have been severely corrupted by environmental noise. As a result, unnecessary recognition errors may potentially frustrate a user and lower the perceived benefit of an otherwise reliable speech recognition system.

Error detection is a necessary component for speech recognition systems to improve their overall usability. For an isolated word, command and control type recognizer, three types of recognition errors can be encountered. The first type of error, called a deletion error, occurs when an input utterance is either not recognized as anything or recognized as environmental noise. In this case, the user interface should properly handle this type of error and re-prompt the user to repeat the utterance. The second type of error, insertion error, occurs when a user does not say anything but the system recognizes an incorrect word. Finally, the third type of error, substitution error, occurs when an incorrect word is recognized instead of the correct utterance. This can happen when a user either says a valid vocabulary word or inadvertently inputs an OOV utterance.

In the case of a speaker dependent recognition system, out-of-vocabulary utterances are usually input by the user when they attempt to select a word they have not enrolled, or when they have forgotten the exact utterances that were previously enrolled. Extraneous background noises or background conversations could also be confused by a speech recognizer as a valid input utterance. The resulting substitution and insertion errors can be the most disrupting, as the system might initiate an invalid action that has to be aborted then by the user. The ability to identify and properly handle these two types of recognition errors can significantly improve the overall performance of a speech recognition system. Furthermore, in the event the speech recognition system is being used in a hands-busy or eyes-busy situation, such as while driving, unnecessary system demands for user attention should be avoided.

Numerous techniques dealing with threshold based confidence measures for detecting recognition errors have been researched and implemented for isolated and continuous-type recognition systems. Confidence measures based on the results of an N-best Viterbi search have been used. While useful for identifying certain substitution errors, these techniques are not an adequate approach for identifying OOV occurrences. The increased computational complexity of a confidence measure based on an N-best search approach may be a considerable drawback when considering low-cost DSP implementations.

Prior art methods utilized in speaker independent systems for dealing with the rejection of OOV utterances are based on an explicit garbage, or filler, model trained off-line on a multi-speaker database of OOV utterances. The model can be characterized as a parametric representation of a vocabulary item in the data store of a speech recognition system. Typical representations of a model include a conventional template as used in a dynamic time warping (DTW) type recognizer, a statistical representation, as is current in a Hidden Markov Model (HMM) recognizer, or the set of weights used to characterize a multi-layer artificial neural network (ANN). In the case of the explicit garbage model, when the input utterance corresponds to an OOV item, the best match resulting from the standard Viterbi decoder corresponds to the garbage model. This methodology is usually not adequate for a speaker dependent system as a database of OOV utterances is not a priori available to train an off-line model for a particular user. Furthermore, it is not practical to request a user to provide a series of input tokens, not part of the regular user's vocabulary, for the sole purpose of training an on-line garbage model.

Yet another prior art method used initially in key-word spotting applications does not require an explicit filler model. This method is based on an average local garbage score that is calculated from the N-best scores at each time frame. A frame can be defined, for example, as a time interval over which some relevant parameters are extracted from the speech signal. This frame becomes then the time unit over which the recognizer operates. Once the decoding process is complete, a total garbage score can be computed by summing local garbage scores over the end-points of the recognized utterance. However, the disadvantage of such an approach is that the global garbage score is computed as a post-processing step, and it relies on end-points corresponding to the best vocabulary match. Such an approach also implies a perfect alignment of the garbage model with the recognized utterance, and such a forced alignment may not be as efficient and accurate as a technique relying on a separate model for handling OOV occurrences.

Accordingly, there is a need for a method of calculating a standard garbage model for the detection of OOV utterances within the framework of a speaker dependent system.

DESCRIPTION OF THE PREFERRED EMBODIMENT

Figure 1:
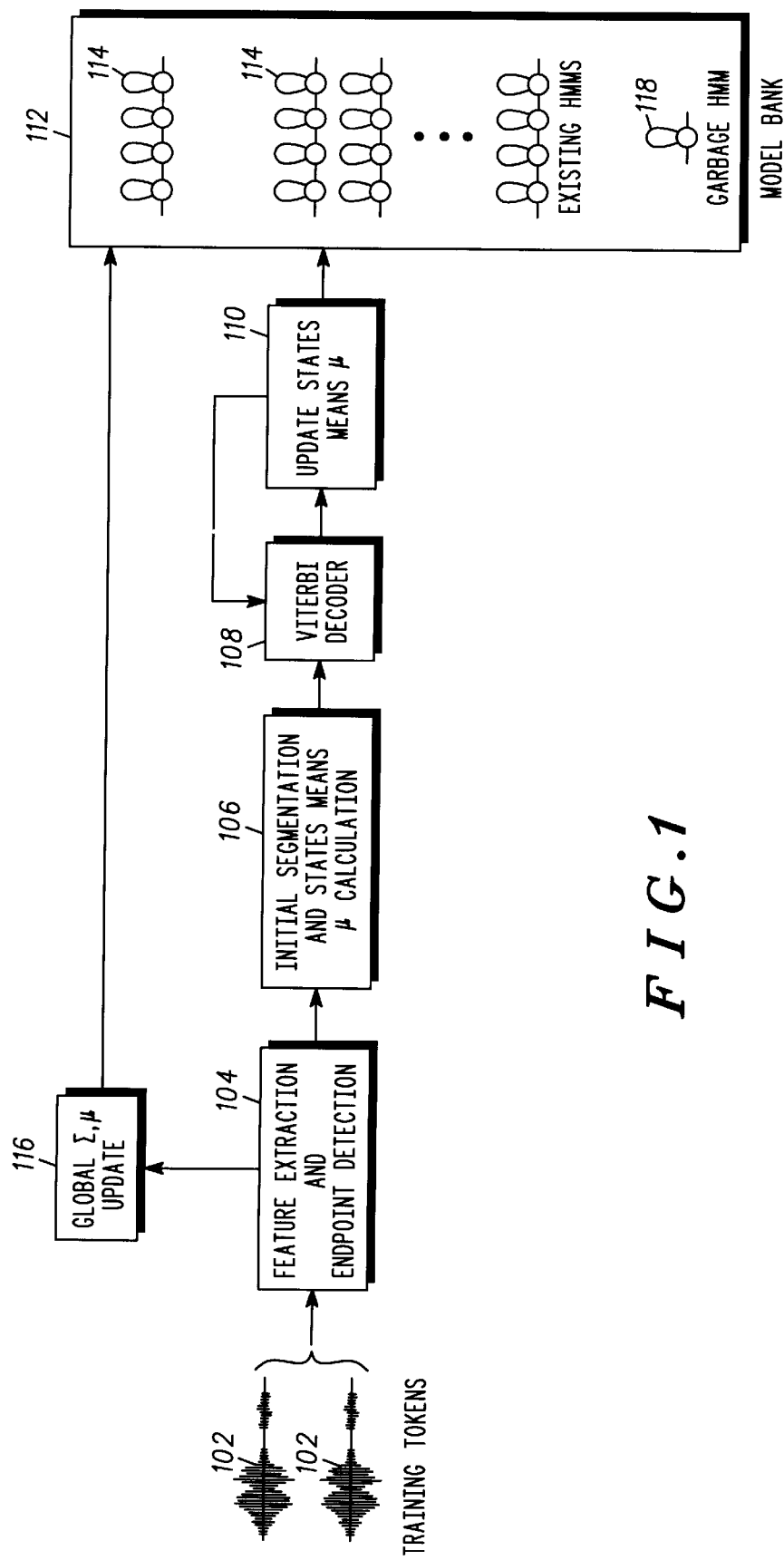
FIG. 1 is a functional block diagram of a training module of a speech recognition system according to the present invention.

The present disclosure describes an on-line modeling technique that enables the rejection of OOV words, as well as some other substitution type errors, in various operating environments. The method described in the present disclosure improves the overall usability of a speaker dependent system as it provides a more robust error handling mechanism, reducing the potential annoyance of the user. The method described in this disclosure attempts to control and reduce, across various environmental conditions, the occurrence of substitution or insertion errors while at the same time trying to minimize the rejection of an utterance that otherwise would have been correctly recognized by the system (i.e. false alarm rate).

In particular, the present disclosure provides a method of calculating a standard filler (or garbage) model for the detection of OOV utterances within the framework of a speaker dependent system. The method is carried out on-line while the user is enrolling the vocabulary, and the garbage model is generated as a by-product of the vocabulary enrollment procedure. Therefore, the method does not require any additional calculations and only requires minimal additional memory storage. The method of the present disclosure eliminates the need to estimate the garbage model parameters off-line and the need for the user to provide potential OOV utterances during this training process. The garbage model described in this disclosure can be considered as an average speaker model, representative of all the speech data enrolled by the user to date, and is preferably similar in it characteristics and topology to all the other regular vocabulary models available in the model storage bank.

While the garbage model is processed in the same fashion as all the other models associated with standard vocabulary items, a weight is preferably used to adjust its local penalty. Unlike prior art methods, no post-processing or word endpoint calculations are required to assess the validity of an input utterance. Because the model's complexity is usually less than that of a model associated to a regular vocabulary item, the technique of the present invention does not have a major impact on the overall real-time performance of a recognizer, while at the same time it provides additional safeguards for identifying potential recognition errors.

During the recognition phase, the method of the present invention will match OOV items as well as in-vocabulary utterances that do not provide a strong match to one of the existing vocabulary models. Given that the only available data during the training phase is valid speech data, one possible approach for determining a garbage model could be based on an average of all the speech data supplied to date by the user. This average or global speaker model will then serve the purpose of a "catch-all" model during the recognition phase. The scores associated with this catch-all or garbage model will be worse than those of the correct model when a valid utterance is spoken. On the other hand, in the presence of an OOV utterance or of an utterance that has been severely distorted by ambient noise, one can expect the score of the garbage model to be better than any of the scores associated with models representing valid utterances.

The training algorithm used in the speaker dependent system is very well suited for the determination of such a garbage model. According to the present invention, the garbage model is generated as a by-product of the training process, and its estimation requires no additional computation. The speaker dependent system is preferably based on HMM technology where each HMM state is preferably characterized by a single Gaussian density. The parameters of each Gaussian density, namely a mean vector and a covariance matrix, are preferably calculated as follows. The mean for each HMM state is estimated from the feature vector assignment in each state of the model. The covariance matrix is calculated from data pooled across all the states of all the existing vocabulary items to ensure sufficient robustness to environmental variations. As more vocabulary items are being trained by the user, the global covariance matrix is updated to reflect the new data. This refinement of the covariance matrix and its associated global mean is computed in an incremental fashion with the current statistics being updated to account for the additional training utterances. This calculation can be expressed in equation form as follows:

$$\Sigma_N = \frac{1}{1 + \frac{N_0}{N}} \left\{ \frac{1}{N} \left[ \sum_{k=1}^{N} X_k X_k^T \right] - \left(1 + \frac{N_0}{N}\right) M_N M_N^T + \frac{N_0}{N} (\Sigma_0 + M_0 M_0^T) \right\}$$

where $[M_0 \Sigma_0]$ is the previous iteration global sample mean and sample covariance estimate, $M_N$ is the sample mean based on the N samples of parameterized speech $\underline{x}$ of the repetitions of the current vocabulary item to be trained, and $\Sigma_N$ is the new global covariance matrix estimate based on both previous statistics and the current data. This updating process is then repeated each time that a new vocabulary item is trained by the user. As more data is made available, a more robust covariance estimate is thus acquired which then replaces the previous estimate for all the trained vocabulary items. These global covariance and mean estimates, representing statistical information of all the user's speech, can also be used to characterize a one-state garbage model. As the global covariance estimate is being refined with the addition by the user of further vocabulary items, so are the statistics of the garbage model.

Turning now to FIG. 1, a functional block diagram shows the components of a speech recognition system used for training a voice tag and generating a garbage model according to the present method. The functional blocks could be implemented by a digital signal processor, which is well known in the art, or by some other suitable circuit. Training tokens 102 are received as an input to a feature extraction block 104. Although two training tokens are shown, any number of training tokens, including one training token, could be employed according to the present invention.

Feature extraction block 104 analyzes the spectral characteristics of the training tokens on a frameby-frame basis and extracts relevant parameters that characterize these tokens. Feature extraction block 104 produces for each frame of data a parametric representation of speech, such as LPC or cepstral feature vectors. This block also provides word end-point detection for maintaining consistency between the training tokens by detecting and eliminating noise at the beginning and end of each utterance.

The frame-based parametric representations are input to an initial segmentation block 106 which linearly aligns the training data to the states of a Hidden Markov Model (HMM) and calculates an initial mean vector for each of the HMM states. The initial model is then used as a seed in a Viterbi decoder 108 to produce an optimal HMM state alignment of the training data. Using this alignment, block 110 performs an update of the mean vector for each HMM state. Also, an updated global mean vector and global covariance matrix is calculated in a block 116 using previous estimates of the global mean/global covariance and the mean/covariance statistics of the new training data. The computed state mean vectors and global covariance for the newly trained voice-tag are stored in a model bank 112 as a trained HMM 114. In addition, the global mean vector and covariance is used to update the garbage HMM 118.

Figure 2:
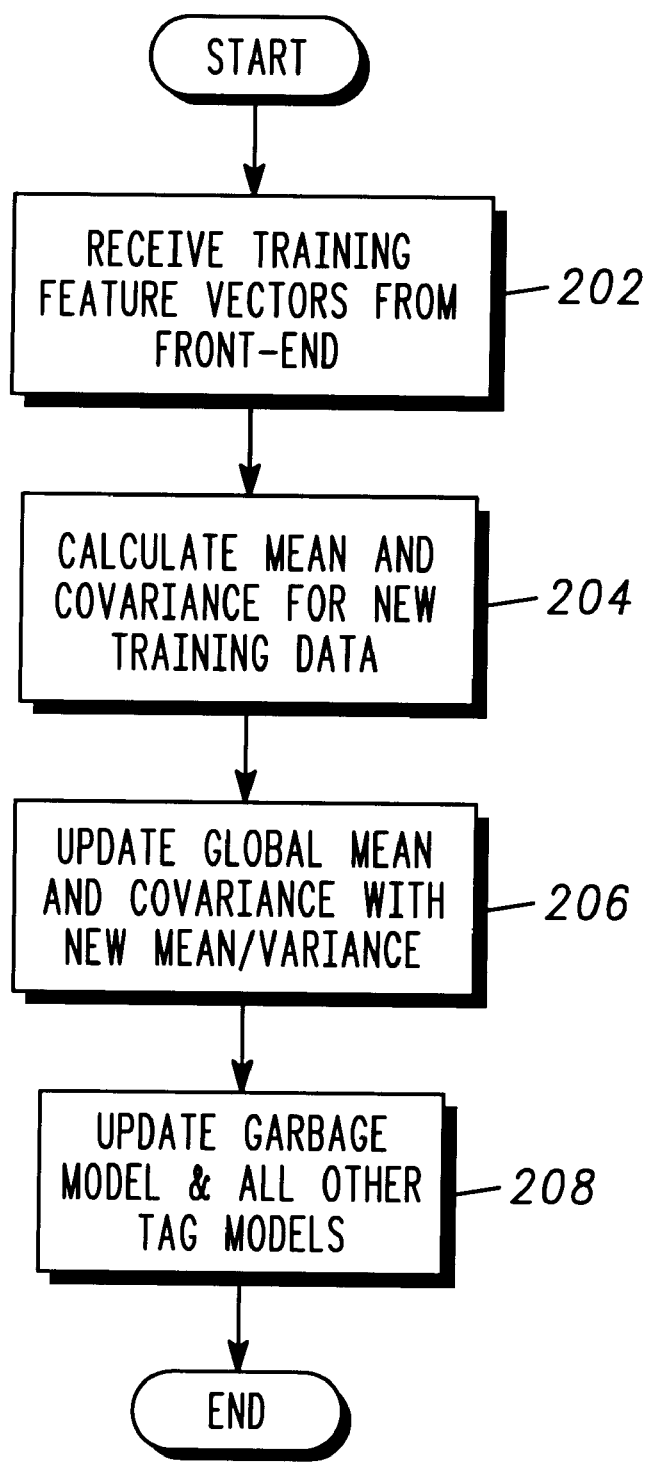
FIG. 2 is a flow chart showing a method for generating and updating a garbage model in a speaker dependent voice recognition system according to the present invention.

Turning now to FIG. 2, the preferred steps for determining the global covariance parameters for the new voice-tag to be trained and updating a garbage model are shown. Such steps are preferably performed by a digital signal processor. The training module receives feature vectors associated with the training tokens 102 from the front-end at step 202. The mean and covariance parameters based on this new training data are calculated in step 204. The recognizer then updates the global mean and global covariance with the new mean and covariance at a step 206, based on the previous estimate of the mean and covariance and the new statistics determined in step 204. These two steps could be performed by an update block such as global update block 116. Finally, the garbage model parameters and all the tag models are updated at a step 208 with these new statistical estimates.

During the recognition phase, the garbage model is handled in the same fashion as all other valid models trained by the user. A local score is computed at each time frame, however now a weight may be applied to this score. This weight controlling the garbage model score can be adjusted, according to the ambient signal-to-noise ratio (SNR), to minimize the occurrence of false rejections while at the same time allowing for the detection of a significant percentage of OOV utterances. Upon completion of the recognition process, if the garbage model is selected as the best match to the input utterance, an error message is propagated back to the user interface. The system can then notify the user of the problem and possibly re-prompt the user to repeat the word or select an utterance that is enrolled in the vocabulary.

Figure 3:
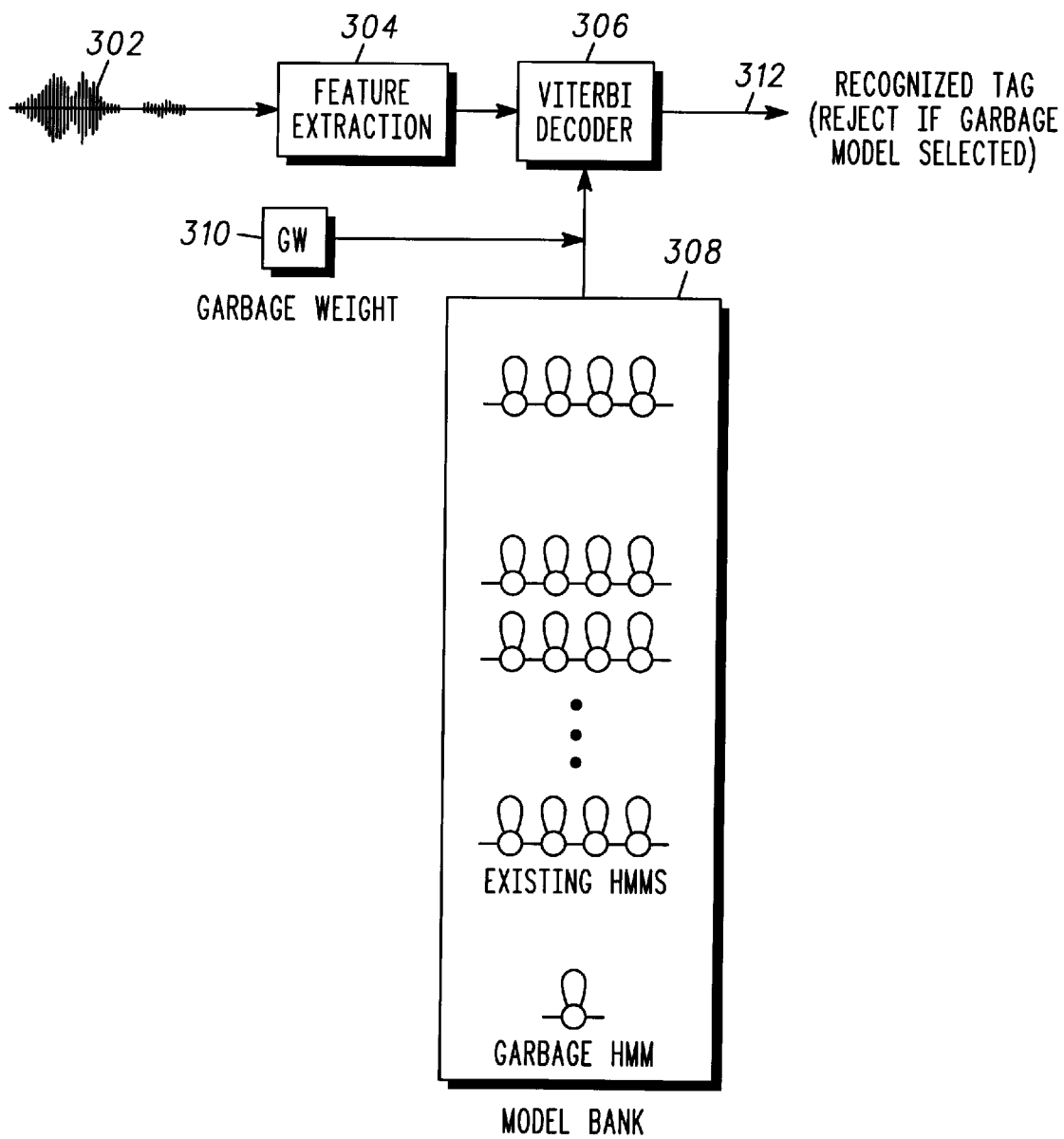
FIG. 3 is a functional block diagram of the recognition module for a speech recognition system according to the present invention.

Turning now to FIG. 3, a functional block diagram shows the blocks of the recognition module used for rejecting OOV items according to the present invention. The functional blocks could be implemented for example in a digital signal processor or some other suitable circuit. Detected voice samples 302 are received by a feature extraction block 304. The relevant parameters extracted by the feature extraction block 304 are then input to a Viterbi decoder 306 to determine the best alignment of the detected speech to one of the existing models stored in the model bank 308. The recognition module generates scores to compare the detected speech to each of the models. The detected speech is also compared to a garbage model to determine whether the detected speech is an OOV item. Depending upon the background conditions or environment in which the user is speaking, an optimized garbage weight 310 can be applied to the garbage model to reduce the number of false OOV detections. An output 312 of the Viterbi decoder representing the recognized tag in the form of a valid vocabulary word or a rejected OOV item is then generated.

Figure 4:
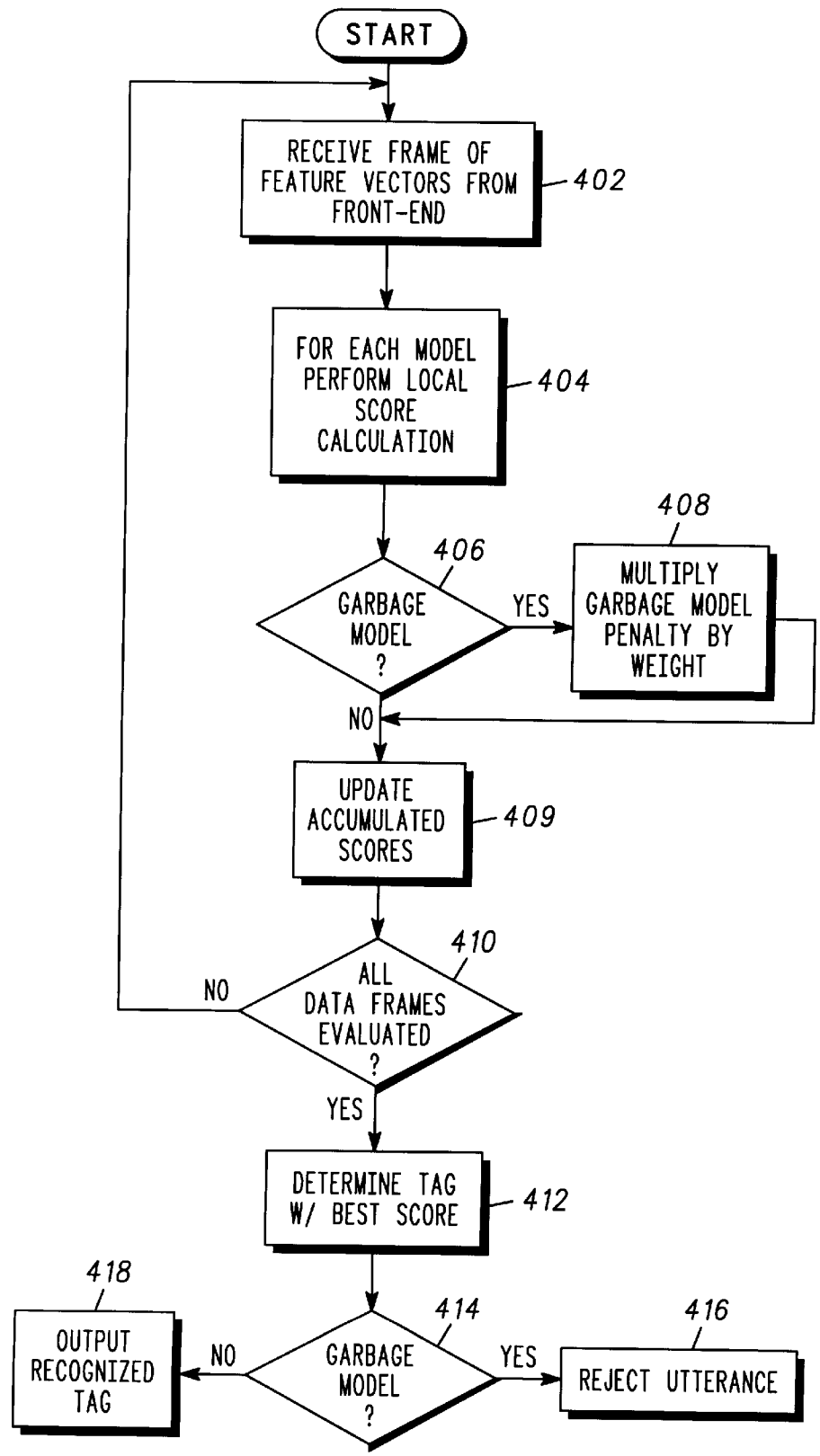
FIG. 4 is a flow chart showing a method of detecting a valid utterance and rejecting an out-of-vocabulary utterance according to the present invention.

Turning now to FIG. 4, a flow chart shows the preferred steps for performing recognition and detecting out-of-vocabulary (OOV) words. These steps are preferably performed by a digital signal processor or some other suitable circuit. The recognizer receives frames of feature vectors from a front end at a step 402. For each model, the recognizer then performs local score calculations based on the current frame of data as part of the statistical pattern matching occurring within a Viterbi decoder at step 404. The recognizer then determines whether the calculated score corresponds to a garbage model at a step 406. If the calculation is based upon a garbage model, the recognizer may multiply the garbage model penalty by a weight at a step 408. Accumulated active path scores are then updated in step 409. The recognizer will then determine whether all data frames have been evaluated at a step 410. If all frames have been evaluated, the recognizer will determine the tag with the best total accumulated score at a step 412. The recognizer will then determine whether the tag with the best score is a garbage model at a step 414. If the tag with the best score is a garbage model, the recognizer will reject the utterance at a step 416 and provide feedback of this event to the user interface. Otherwise, the recognizer will output the recognized tag at a step 418.

Figure 5:
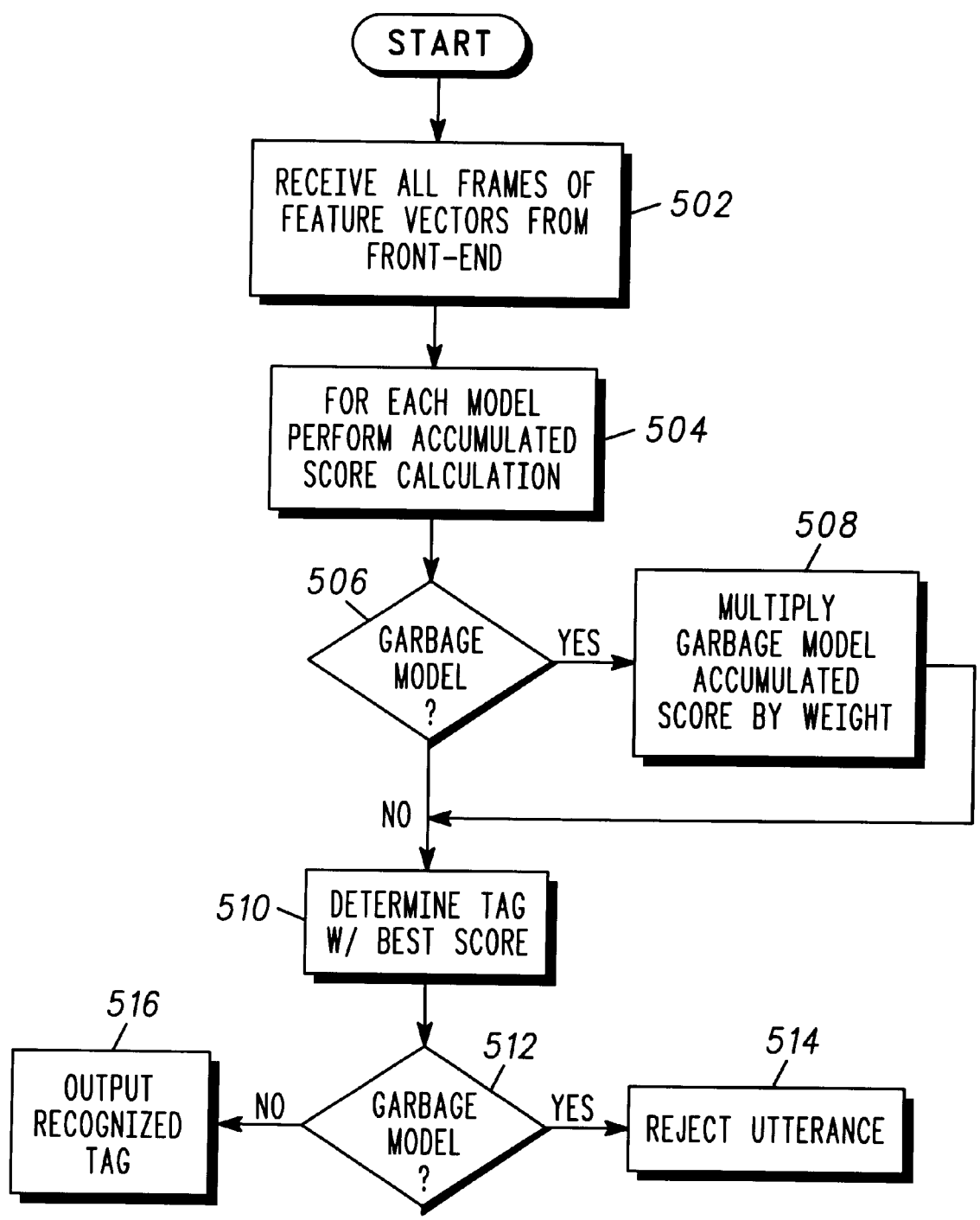
FIG. 5 is a flow chart showing a method of detecting a valid utterance and rejecting an out-of-vocabulary utterance according to an alternate embodiment of the present invention.

Turning now to FIG. 5, a flow chart shows an alternate embodiment for performing recognition and detecting out-of-vocabulary (OOV) words. These steps are preferably performed by a digital signal processor or some other suitable circuit. The recognizer buffers up all the frames of feature vectors of an entire utterance received from a front end at step 502. For each active model on the vocabulary list, an accumulated score calculation is performed based on all the frames of data as part of a pattern matching procedure occurring within a Viterbi decoder at step 504. The recognizer then determines whether the calculated accumulated score corresponds to a garbage model at step 506. If the calculation is based on a garbage model, the recognizer may multiply the garbage model accumulated penalty by a weight at a step 508. The recognizer will then determine the tag with the best accumulated score at a step 510. Next, the recognizer determines whether the tag with the best accumulated score is a garbage model at a step 512. If this tag is a garbage model, the recognizer will reject the utterance at a step 514. Otherwise the recognizer will output the recognized tag at a step 516.

In summary, the present disclosure describes an on-line modeling technique that enables the rejection of OOV words as well as some other substitution type errors in various operating environments. The method described in the present disclosure attempts to control and reduce, across various environmental conditions, the occurrence of substitution or insertion errors while at the same time trying to minimize the false alarm rate. This method also improves the overall usability of a speaker dependent system as it provides a more robust error handling mechanism, which in turn will reduce the potential annoyance of a user.

Although the invention has been described and illustrated in the above description and drawings, it is understood that this description is by way of example only and that numerous changes and modifications can be made by those skilled in the art without departing from the true spirit and scope of the invention. Although the present invention finds particular application in portable cellular radiotelephones, the invention could be applied to any device utilizing speech recognition, including any wireless communication device, telephone infrastructure equipment, pagers, electronic organizers, or computers. Applicants' invention should be limited only by the following claims.

We claim:

1. A method of evaluating an utterance in a speech recognition system, said method comprising the steps of:

receiving new training data in said speech recognition system;

calculating statistical parameters for said new training data;

calculating global statistical parameters based upon said statistical parameters for said new training data; and updating a garbage model based upon said global statistical parameters.

2. The method of evaluating an utterance of claim 1 wherein said step calculating statistical parameters for said new training data comprises calculating a mean and a covariance for said new training data.

3. The method of evaluating an utterance of claim 1 wherein said step of calculating global statistical parameters comprises calculating a global mean and a global covariance for said new training data.

4. The method of evaluating an utterance of claim 1 wherein said step of calculating global statistical parameters comprises calculating global statistical parameters based upon previous global statistical parameters and said statistical parameters for said new training data.

5. The method of evaluating an utterance of claim 1 wherein said step of calculating global statistical parameters comprises calculating global statistical parameters based upon a previous global mean and a previous global variance derived from a data base of trained data available before the start of a training procedure and said mean and said variance for said new data.

6. The method of evaluating an utterance of claim 1 wherein said step of updating a garbage model comprises generating a single state HMM.

7. The method of evaluating an utterance of claim 1 further comprising steps of receiving new recognition data and comparing a model for said new recognition data to a plurality of models previously stored in said speech recognition system.

8. The method of evaluating an utterance of claim 7 wherein said step of comparing a model for said new recognition data further comprises steps of searching data on a frame-by-frame basis and generating an updated score for each model for each frame of said new recognition data.

9. The method of evaluating an utterance of claim 8 further comprising steps of weighing said updated score by a scale factor when said garbage model is evaluated and comparing said updated score of said garbage model and updated scores for each model for each frame of said new recognition data to select which model is a best model as evaluated against all other active models.

10. The method of evaluating an utterance of claim 9 wherein said step of weighing said updated score comprises adjusting said updated score by a scale factor according to environmental conditions.

11. The method of evaluating an utterance of claim 10 wherein said step of weighing said updated score further comprises a step of sensing changes in said environmental conditions.

12. The method of evaluating an utterance of claim 9 further comprising a step of rejecting said utterance if said garbage model has been selected as the best model when evaluated against all other active models.

13. The method of evaluating an utterance of claim 9 wherein said step of weighing said updated score comprises weighing said updated score on a frame-by-frame basis.

14. The method of evaluating an utterance of claim 7 wherein said step of comparing a model for said new recognition data comprises searching data on a model-by-model basis and generating an updated score for each model of said new recognition data.

15. The method of evaluating an utterance of claim 14 further comprising steps of weighing said updated score by a scale factor when said garbage model is evaluated and comparing said updated score of said garbage model and updated scores for each model for each frame of said new recognition data to select which model is a best model as evaluated against all other active models.

16. The method of evaluating an utterance of claim 15 wherein said step of weighing said updated score comprises adjusting said updated score by a scale factor according to environmental conditions.

17. The method of evaluating an utterance of claim 16 wherein said step of weighing said updated score further comprises a step of sensing changes in said environmental conditions.

18. The method of evaluating an utterance of claim 15 further comprising a step of rejecting said utterance if said garbage model has been selected as the best model when evaluated against all other active models.

19. The method of evaluating an utterance of claim 15 wherein said step of weighing said score comprises weighing said updated score on a frame-by-frame basis.

20. A method of evaluating an utterance in a speaker-dependent speech recognition system for receiving data, said method comprising the steps of:
receiving user provided training data;
calculating statistical parameters for said new training data;
calculating a global mean and global variance based upon said mean and said covariance for said new training data; and
updating a garbage model based upon said global mean and said global covariance.

21. The method of evaluating an utterance of claim 20 wherein said step of calculating statistical parameters for said new training data comprises calculating a mean and a covariance for said new training data.

22. The method of evaluating an utterance of claim 20 wherein said step of calculating global statistical parameters comprises calculating a global mean and a global covariance for said new training data.

23. The method of evaluating an utterance of claim 22 wherein said step of calculating global statistical parameters comprises calculating global statistical parameters based upon previous global statistical parameters and said statistical parameters for said new training data.

24. The method of evaluating an utterance of claim 20 wherein said step of calculating global statistical parameters comprises calculating global statistical parameters based upon a previous global mean and a previous global variance received from a data base of trained data available before the start of a training procedure and said mean and said covariance for said new data.

25. The method of evaluating an utterance of claim 20 wherein said step of updating a garbage model comprises generating a single state HMM.

26. The method of evaluating an utterance of claim 20 further comprising steps of receiving new recognition data and comparing a model for said new recognition data to a plurality of models previously stored in said speech recognition system.

27. The method of evaluating an utterance of claim 26 wherein said step of comparing a model for said new recognition data further comprises steps of searching data on a frame-by-frame basis and generating an updated score for each model for each frame of said new recognition data.

28. The method of evaluating an utterance of claim 27 further comprising steps of weighing said updated score by a scale factor when said garbage model is evaluated and comparing said updated score of said garbage model and updated scores for each model for each frame of said new recognition data to select which model is a best model as evaluated against all other active models.

29. The method of evaluating an utterance of claim 28 wherein said step of weighing said updated score comprises adjusting said updated score by a scale factor according to environmental conditions.

30. The method of evaluating an utterance of claim 29 wherein said step of weighing said updated score further comprises a step of sensing changes in said environmental conditions.

31. The method of evaluating an utterance of claim 28 further comprising a step of rejecting said utterance if said garbage model has been selected as the best model when evaluated against all other active models.

32. The method of evaluating an utterance of claim 28 wherein said step of weighing said score comprises weighing said updated score on a frame-by-frame basis.

33. The method of evaluating an utterance of claim 26 wherein said step of comparing a model for said new recognition data comprises searching data on a model-by-model basis.

34. The method of evaluating an utterance of claim 33 further comprising steps of weighing said updated score by a scale factor when said garbage model is evaluated and comparing said updated score of said garbage model and updated scores for each model for each frame of said new recognition data to select which model is a best model as evaluated against all other active models.

35. The method of evaluating an utterance of claim 34 wherein said step of weighing said updated score comprises adjusting said updated score by a scale factor according to environmental conditions.

36. The method of evaluating an utterance of claim 35 wherein said step of weighing said updated score further comprises a step of sensing changes in said environmental conditions.

37. The method of evaluating an utterance of claim 34 further comprising a step of rejecting said utterance if said garbage model has been selected as the best model when evaluated against all other active models.

38. The method of evaluating an utterance of claim 34 wherein said step of weighing said score comprises weighing said updated score on a frame-by-frame basis.

39. A method of evaluating an utterance in a speaker-dependent speech recognition system for receiving data, said method comprising the steps of:

calculating a global mean and a global covariance based upon previously received training data;

receiving new training data;

calculating a mean and a covariance for said new training data;

updating said global mean and said global covariance based upon said mean and said covariance for said new training data; and updating a garbage model based upon an updated global mean and an updated global covariance.

40. A method of evaluating an utterance in a speaker-dependent speech recognition system for receiving data, said method comprising the steps of:

calculating a global mean and a global covariance based upon previously received training data;

receiving new training data;

calculating a mean and a covariance for said new training data;

updating said global mean and said global covariance based upon said mean and said covariance for said new training data;

updating a single state HMM model for all data based upon an updated global mean and an updated global covariance;

receiving new data for operating said speaker-dependent speech recognition system;

comparing a model for said new data to a plurality of models previously stored in said speaker-dependent speech recognition system;

determining which of said plurality of models is a single state HMM model for all data;

multiplying said single state HMM model for all data by a penalty weight;

comparing said plurality of models as modified by said penalty weight to determine a best model from the list of active models; and rejecting said utterance if a garbage model has been selected as the best model from the list of active models.

* * * * *